March 25, 1952     J. J. SCHERMULY     2,590,468
THRUST BEARING FOR DISK PLOWS
Filed Feb. 11, 1949     2 SHEETS—SHEET 1
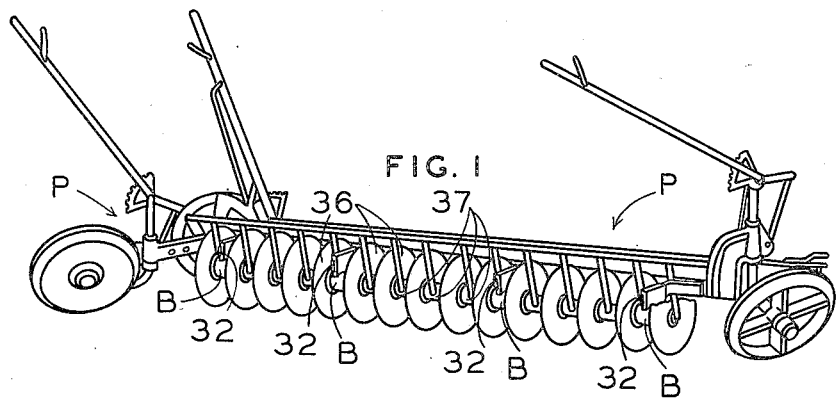
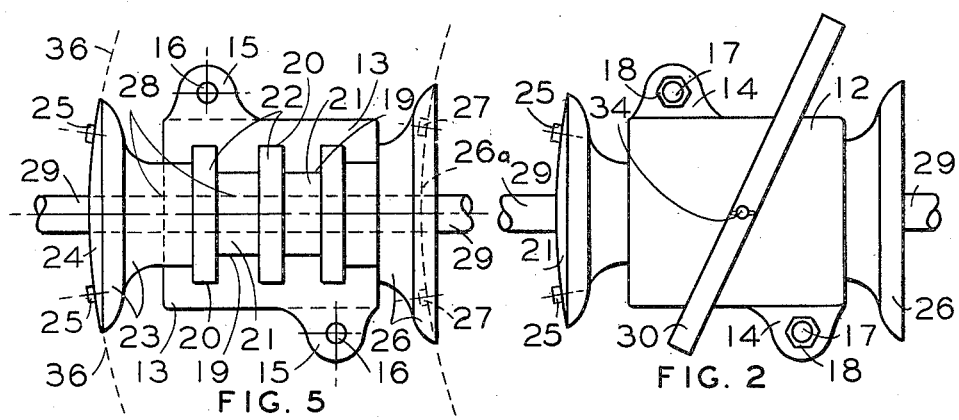
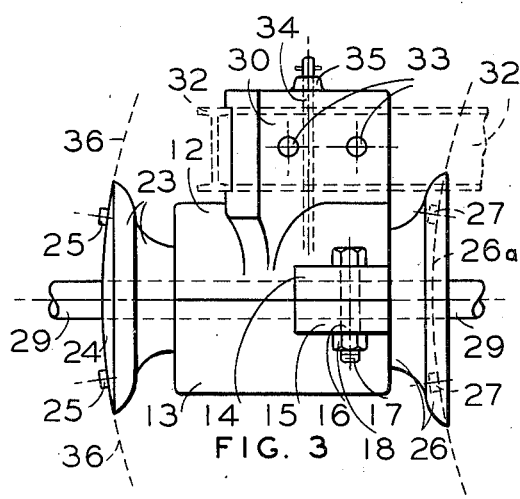 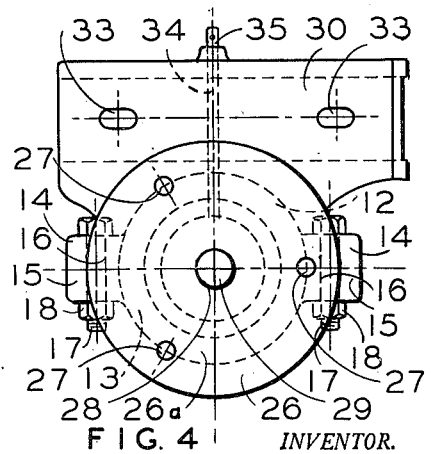
INVENTOR.
JOSEPH J. SCHERMULY
BY
M. Y. Charles
ATTORNEY.

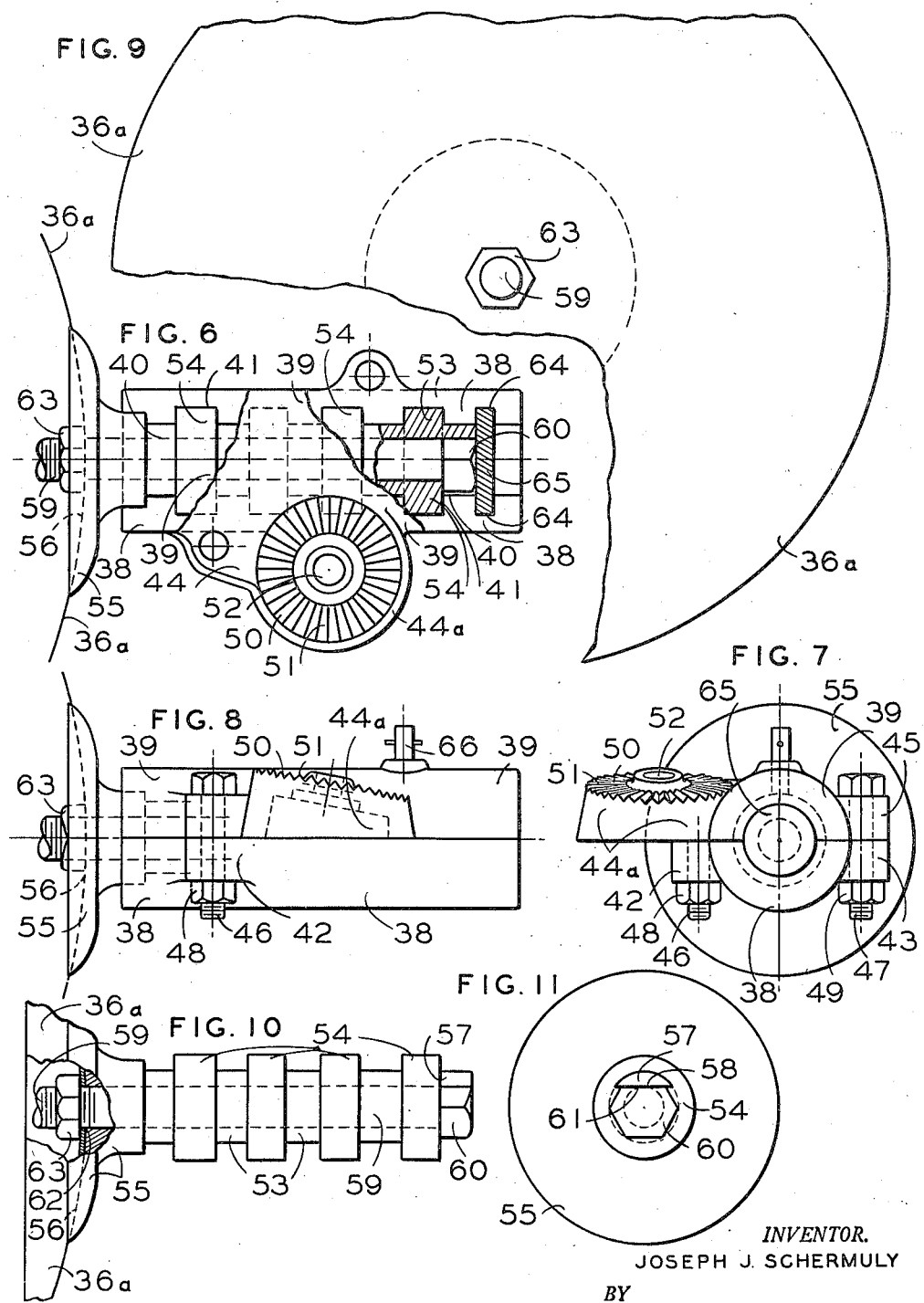
March 25, 1952     J. J. SCHERMULY     2,590,468
THRUST BEARING FOR DISK PLOWS
Filed Feb. 11, 1949     2 SHEETS—SHEET 2
INVENTOR.
JOSEPH J. SCHERMULY
BY M. Y. Charles
ATTORNEY.

Patented Mar. 25, 1952

2,590,468

UNITED STATES PATENT OFFICE 2,590,468

THRUST BEARING FOR DISK PLOWS

Joseph J. Schermuly, Wichita, Kans.

Application February 11, 1949, Serial No. 75,881

1 Claim. (Cl. 97—220)

My invention relates to an improvement in thrust bearings for farm machinery and is designed more particularly for use on disk plows and the like, where there is a heavy end thrust on the bearings.

Now referring to the accompanying drawings in which similar numerals of reference designate the same parts throughout the several figures of the drawings:

Fig. 1 is a rear view of a multiple disk plow in which my improved thrust bearings are used.

Fig. 2 is an enlarged detail top plan view of the bearing.

Fig. 3 is a side view of the bearing.

Fig. 4 is an end view of the bearing.

Fig. 5 is a top plan view of the bearing, the cap of the bearing being removed for convenience of illustration.

Fig. 6 is a top plan view of a modified form of the bearing, the bearing being designed for carrying a single disk. In this figure, parts are broken away for convenience of illustration.

Fig. 7 is a rear end view of the modified form of the bearing.

Fig. 8 is a side view of the support side of the modified form of the bearing.

Fig. 9 is a view showing a portion of the face of a disk and illustrating the method of attachment of the disk to the bearing.

Fig. 10 is a detail plan view of the journal portion of the bearing.

Fig. 11 is a rear end view of the journal portion of the bearing shown in Fig. 10.

In the drawings is shown a multiple disk plow P in which my improved thrust bearings are used and are shown at the points B. The bearing device comprises two bearing halves 12 and 13 each of which have outwardly extending ear elements 14 and 15, the ears 14 and 15 are each provided with holes 16 that register with each other when the two bearing halves 12 and 13 are placed in their assembled position and bolts 17 are passed therethrough and nuts 18 are threaded on the bolts 17 to rigidly hold the two bearing halves 12 and 13 together. The assembled bearing halves 12 and 13 are provided with a bore 19 that has a series of outwardly extending annular grooves 20.

The journal comprises a shaft 21 that is adapted to be revolvably received in the bearing bore 19 and is provided with a series of outwardly extending annular members 22 that are integrally formed thereon and are receivable one in each of the annular grooves 20. One end of the shaft 21 is provided with a disk support head 23 that is preferably integrally formed on the shaft 21, the outer face of the head 23 is in the form of a convex portion 24 of a sphere, and is provided with a plurality of outwardly extending, and equally spaced apart, studs 25 that are positioned equal distances from the center axis of the shaft 21, the other end of the shaft 21 is provided with a head portion 26 that is preferably integrally formed on the shaft 21 and is of the same diameter as the head 23 but the face of the disk is concave 26a and in the form of a portion of a sphere, the face of the head 26 is provided with a plurality of outwardly extending studs 27 that are equally spaced apart and are spaced equal distance from the center axis of the shaft 21, the shaft 21 and heads 23 and 26 have an axial bore 28 therethrough through which is positioned a disk stringer shaft 29.

The upper half 12 of the bearing element is provided with an upwardly extending support plate 30 that is positioned diagonally across the bearing half 12 as shown in Fig. 2 and also shown in Figs. 3 and 4, one side of the support plate 30 is provided with a channel formation 31 to receive a support element 32 that is connected to the frame portion of the plow, the plate 30 is provided with bolt holes 33 through which bolts may be passed to rigidly attach the support plate 30 to the support element 32, the support plate 30 and bearing half 12 have a hole 34 therethrough that extends from the top of the plate 30 to, and opens into, the center groove 20 of the bearing, on the top edge of the support plate 30 is an oiler 35 that is threaded into the upper end of the hole 34 whereby oil may be forced through the oiler 35 and into the annular groove 20 and the bore 19 to lubricate the bearing, shaft, and the annular members 22.

In assembling the disks in the plow, the disks 36 are strung on the stringer shaft 29 with spacer elements 37 between each successive disk to equally space the disks apart. With the concave face of one of the disks being seated against the convex face 24 of the head 23 and the studs 25 being seated in matching holes in the disk 36 whereby the disk as it works in the process of plowing will be revolved by the ground being plowed and which will in turn revolve the head 23, shaft 21 and the annular members 22 and the head 26, similarly on the other side of the bearing, disks will be strung on the shaft 29 and the convex face of one of the disks 36 will be seated against the concave face 26a with the studs 27 being seated in matching holes in the disk 36 so that the disk being revolved the same as the previously described disk 36 will also assist in revolving the heads 23 and 26, shaft 21 and the annular members 22, the device is of such length that the disks 36 bearing against the heads 23 and 26 are the same distance apart as all the other disks 36 that are strung on the shaft 29, and separated by the separators 37.

In Figs. 6 to 11 inclusive is shown a bearing of similar characteristics to that above described except that the bearing is designed for carrying a single disk instead of being used with a multiplicity of disks as above described. The device as shown in Figs. 6 to 11 inclusive comprises the two bearing halves 38 and 39 having a bore 40 therethrough and having outwardly extending annular grooves 41 connecting therewith. The lower bearing half 38 is provided with a pair of outwardly extending ears 42 and 43 that correspond with similar ear elements 44 and 45 on the upper half 39 of the bearing and the ears 42 and 44, 43 and 45 have registering holes therein to receive bolts 46 and 47 on which is threaded nuts 48 and 49 rigidly hold the two bearing halves 38 and 39 together, the ear 44 is provided with an extension portion 44a that is also an integral part of the bearing half 39 and is provided with an upwardly directed sloping face 50 on which is formed radially positioned V-shaped teeth 51 about the center axis of a hole 52 that is for the purpose of receiving a bolt not shown, to bind a support piece, not shown, having an opening therein matching the hole 52 and also having teeth matching and engageable with the teeth 51 on the ear 44a whereby the bearing may be rigidly held in adjusted angular positions.

Within the bore of the bearing halves 38 and 39 is a hollow shaft 53 having outwardly extending and spaced apart annular thrust elements 54 that are integrally formed thereon. One end of the shaft 53 is also provided with a disk support plate 55 that is also integrally formed on the shaft 53, the outer face of the plate 55 is concave as indicated at 56 in the form of a part of a sphere so as to receive the convex face of the central portion of a disk 36a. The rear end of the shaft 53 is provided with a rearwardly extending lip element 57 having a flat face 58 that is substantially tangent with the circle of the hollow of the shaft 53, in the hollow of the shaft 53 is positioned a long bolt 59 having a head 60 thereon one side of which has been removed to form a flat surface 61 that will slide into engagement with the flat face of the lip 57 so as to make the bolt 59 rigid with, and forcing it to revolve with the shaft 53. The outer end of the bolt 59 projects through the disk supporting plate 55 and through a hole 62 in the center of the disk 36a and a nut 63 is threaded on the outer end of the bolt 59 to rigidly bind and hold the disk 36a in place on the support plate 55.

The rear end of the bearing halves 38 and 39 are provided with an annular groove 64 in which may be seated a round disk 65 as a closure for the bearing end.

The shaft 53 is revolvably positioned within the bore 40 and the thrust elements 54 are revolvably positioned within the grooves 41. The bearing half 39 is provided with an oiler 66 that opens into an opening connecting with one of the grooves 41 whereby oil may be entered into the bearing surfaces as will be readily understood.

The bearing device and disk having been assembled as above described is now ready for use, and as the disk 36a is revolved by the ground in the process of plowing, the disk will also revolve the shaft 53 and thrust bearing elements 55 thereon as will be readily understood.

In both the design shown in Figs. 2, 3, 4, and 5, and in Figs. 6 and 10 the same conditions obviously are present, that is that the thrust elements 22 and 54 due to the push of their respective disks 36 or 36a will bear against the side walls of the annular grooves 20 and 41 and these grooves being well lubricated will allow the parts working therein to revolve easily. Due to the particular design of both bearing devices, very little dirt can enter into the bearings at the ends thereof, and of course, no dirt can enter into the central portions of the bearings, therefore, the bearings can always be well lubricated and will always run free and easy with little or no wear so as to provide end play in the bearing and the bearings will therefore be extremely long lived and will last probably as long as the rest of the machine.

While the device as shown in the drawings and described in the foregoing specification is probably the preferred form of the device, it is to be understood that such modifications of the invention may be employed as lie within the scope of the appended claims without departing from the spirit and intention of the invention.

Now having fully shown and described my invention, what I claim is:

In a thrust bearing device of the kind described; said thrust bearing device consisting of the combination of a journal element and a bearing element in which the journal element is revolvably carried, said journal element comprising a single piece of material formed into a journal shaft section on which is integrally formed a series of spaced apart annular and outwardly extending flange portions, the sides of which lie in parallel planes, one end of the journal shaft section having a disk holder element integrally formed thereon having a convex sphere portion formed thereon that is positioned concentric with the said journal shaft section, the other end of the said journal shaft section having a disk holder integrally formed thereon and having a concave spherical shaped portion for disk receiving purposes formed therein and being positioned concentric with the said journal shaft section, each of said convex and concave formations having studs projecting therefrom for reception in holes in a disk whereby the revolving of the disks will revolve the entire foregoing defined structure, said bearing element being made in two halves that are detachably attached each to the other and form an annular grooved bearing that matches the aforedefined shaft section and flanges thereon and in which the shaft section and flanges thereon are revolvably carried, and hanger means integrally formed on one of said bearing halves for attachment to a supporting element for the bearing, said hanger means and bearing half having a lubrication passage therethrough and terminating at the central portion of the said journal section.

JOSEPH J. SCHERMULY.

REFERENCES CITED

The following references are of record in the file of this patent:

UNITED STATES PATENTS

| Number | Name | Date |
|---|---|---|
| 697,059 | Willis et al. | Apr. 8, 1902 |
| 1,386,491 | Brown | Aug. 2, 1921 |
| 1,416,906 | Strom et al. | May 24, 1922 |
| 2,097,244 | Sjogren et al. | Oct. 26, 1937 |